US008435590B2

(12) United States Patent
Rinaldi et al.

(10) Patent No.: US 8,435,590 B2
(45) Date of Patent: May 7, 2013

(54) USE OF NOVEL CARBOHYDRATES AND CARBOHYDRATE BLENDS TO PROVIDE A SPORTS BEVERAGE WITH INCREASED ABSORPTION (75) Inventors: Vincent Rinaldi, Bethel, CT (US); Jeff Zachwieja, Cary, IL (US); Xiaocai Shi, Algonquin, IL (US); Zeinab Ali, Crystal Lake, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 687 days.

(21) Appl. No.: 12/276,976

(22) Filed: Nov. 24, 2008

(65) Prior Publication Data
US 2010/0129497 A1    May 27, 2010

(51) Int. Cl.
*A23L 2/00* (2006.01)

(52) U.S. Cl.
USPC .......................................... 426/590; 426/658

(58) Field of Classification Search .................... 426/658
See application file for complete search history.

(56) References Cited

U.S. PATENT DOCUMENTS

| | | |
|---|---|---|
| 3,894,148 A | 7/1975 | Ecker |
| 4,237,118 A | 12/1980 | Howard |
| 4,312,856 A | 1/1982 | Korduner et al. |
| 4,322,407 A | 3/1982 | Ko |
| 4,448,770 A | 5/1984 | Epting, Jr. |
| 4,582,705 A | 4/1986 | Primes et al. |
| 4,592,909 A | 6/1986 | Winer et al. |
| 4,649,051 A | 3/1987 | Gyllang et al. |
| 4,689,228 A | 8/1987 | Rosenberg |
| 4,738,856 A | 4/1988 | Clark |
| 4,853,237 A | 8/1989 | Prinkkila et al. |
| 4,871,550 A | 10/1989 | Millman |
| 4,871,554 A | 10/1989 | Kalala et al. |
| 4,874,606 A | 10/1989 | Boyle et al. |
| 4,938,970 A | 7/1990 | Hustead et al. |

(Continued)

FOREIGN PATENT DOCUMENTS

| | | |
|---|---|---|
| CA | 896486 | 3/1972 |
| DE | 297 01 817 | 4/1997 |

(Continued)

OTHER PUBLICATIONS

Grysman: Grysman, A; Carlson, T; Wolever, TMS. Effects of sucromalt on postprandial responses in human subjects. Eur J Clin Nutr. Published online Aug. 7, 2007. pp. 1364-1371. <URL:http://www.nature.com/ejcn/journal/v62/n12/abs/1602890a.html>.*

(Continued)

*Primary Examiner* — Helen F Heggestad
(74) *Attorney, Agent, or Firm* — Banner & Witcoff, Ltd.

(57) ABSTRACT

A carbohydrate blend is provided, including at least fructose and glucose. Some or all of the glucose may be provided by glucooligosaccharides having a structure containing up to ten degrees of saccharide polymerization. An aqueous solution having 6% by weight of the carbohydrate blend has a measured osmolality of 230-300 mOsm/kg. Further, the measured osmolality of the carbohydrate solution is substantially stable during storage for up to six months. Also, a rehydration/sports beverage composition is provided, including water, a carbohydrate blend, electrolytes, and optionally edible acids, coloring agents, flavoring agents and the like. The beverage composition may have a measured osmolality of about 230-260 mOsm/kg, which provides faster absorption by the gastrointestinal system of a subject than a beverage composition with a higher osmolality.

16 Claims, 2 Drawing Sheets

U.S. PATENT DOCUMENTS

| | | |
|---|---|---|
| 4,975,286 A | 12/1990 | Hechter |
| 4,981,687 A | 1/1991 | Fregly et al. |
| 5,011,826 A | 4/1991 | Steudle et al. |
| 5,028,437 A | 7/1991 | Jerrett |
| 5,032,411 A | 7/1991 | Stray-Gundersen |
| 5,089,477 A | 2/1992 | Fregley et al. |
| 5,112,622 A | 5/1992 | Kopp |
| 5,114,723 A | 5/1992 | Stray-Gundersen |
| 5,147,650 A | 9/1992 | Fregley et al. |
| 5,200,200 A | 4/1993 | Veech |
| 5,238,684 A | 8/1993 | Fregly et al. |
| 5,248,507 A | 9/1993 | e Silva et al. |
| 5,270,297 A * | 12/1993 | Paul et al. .............. 514/23 |
| 5,397,786 A | 3/1995 | Simone |
| 5,443,830 A | 8/1995 | Moore et al. |
| 5,443,848 A | 8/1995 | Kramer et al. |
| 5,447,730 A | 9/1995 | Greenleaf |
| 5,455,235 A | 10/1995 | Takaichi et al. |
| 5,464,619 A | 11/1995 | Kuznicki et al. |
| 5,498,426 A | 3/1996 | Wilson et al. |
| 5,498,427 A | 3/1996 | Menasche |
| 5,597,595 A | 1/1997 | DeWille et al. |
| 5,609,897 A | 3/1997 | Chandler et al. |
| 5,681,569 A | 10/1997 | Kuznicki et al. |
| 5,780,094 A | 7/1998 | King |
| 5,817,351 A | 10/1998 | DeWille et al. |
| 5,824,353 A | 10/1998 | Tsunoda et al. |
| 5,830,523 A | 11/1998 | Takaichi et al. |
| 5,846,572 A | 12/1998 | Prior |
| 5,869,458 A | 2/1999 | Waite et al. |
| 5,968,544 A | 10/1999 | Howard et al. |
| 6,020,007 A | 2/2000 | Veech |
| 6,056,989 A | 5/2000 | Sasagawa et al. |
| 6,103,274 A | 8/2000 | Jettka et al. |
| 6,106,874 A | 8/2000 | Liebrecht et al. |
| 6,207,203 B1 | 3/2001 | Atkinson et al. |
| 6,235,322 B1 | 5/2001 | Lederman |
| 6,251,457 B1 | 6/2001 | Takaichi et al. |
| 6,261,610 B1 | 7/2001 | Sher et al. |
| 6,296,892 B1 * | 10/2001 | Elseviers et al. .............. 426/653 |
| 6,319,490 B1 | 11/2001 | Parker |
| 6,451,352 B1 | 9/2002 | Yvin et al. |
| 6,478,985 B2 | 11/2002 | Idaka |
| 6,485,764 B2 | 11/2002 | Robergs et al. |
| 6,572,898 B2 | 6/2003 | Nelson et al. |
| 6,730,337 B2 | 5/2004 | Hutt et al. |
| 7,001,612 B2 | 2/2006 | Armonti et al. |
| 2001/0043908 A1 | 11/2001 | Parker |
| 2001/0051197 A1 | 12/2001 | Yang et al. |
| 2002/0009502 A1 | 1/2002 | Nelson et al. |
| 2002/0044992 A1 | 4/2002 | Parker |
| 2002/0099023 A1 | 7/2002 | Boucher, Jr. |
| 2002/0102313 A1 | 8/2002 | Armonti et al. |
| 2002/0110621 A1 | 8/2002 | Robergs et al. |
| 2002/0119183 A1 | 8/2002 | Hermelin et al. |
| 2002/0132034 A1 | 9/2002 | Hutt et al. |
| 2002/0132214 A1 | 9/2002 | Mattson et al. |
| 2002/0176885 A1 | 11/2002 | Najafi et al. |
| 2003/0021875 A1 | 1/2003 | Blank et al. |
| 2003/0077333 A1 | 4/2003 | Phillips et al. |
| 2003/0119755 A1 | 6/2003 | Mazer |
| 2003/0134804 A1 | 7/2003 | King et al. |
| 2003/0194448 A1 | 10/2003 | Mitchell et al. |
| 2003/0203072 A1 | 10/2003 | O'Mahony et al. |
| 2005/0095271 A1 | 5/2005 | Mathewson |
| 2005/0100637 A1 | 5/2005 | Murray et al. |
| 2006/0100172 A1 | 5/2006 | Monsan et al. |
| 2007/0003670 A1* | 1/2007 | Jendrysik et al. .............. 426/74 |
| 2007/0048425 A1* | 3/2007 | Schwarz et al. .............. 426/548 |
| 2007/0059362 A1 | 3/2007 | Rau |
| 2007/0184177 A1* | 8/2007 | Harrison et al. .............. 426/660 |
| 2007/0292483 A1 | 12/2007 | Rinaldi et al. |
| 2008/0139964 A1 | 6/2008 | Murray et al. |
| 2008/0286874 A1 | 11/2008 | Murray et al. |
| 2008/0292499 A1 | 11/2008 | Murray et al. |

FOREIGN PATENT DOCUMENTS

| | | |
|---|---|---|
| DE | 197 00 241 A1 | 7/1998 |
| EP | 0364053 | 4/1990 |
| EP | 0587972 | 3/1994 |
| GB | 1252781 | 11/1971 |
| GB | 1252781 | 11/1997 |
| JP | 6332766 | 6/1980 |
| JP | 6016221 | 9/1981 |
| JP | 59098670 | 6/1984 |
| JP | 59210872 | 11/1984 |
| JP | 59220177 | 12/1984 |
| JP | 6112887 | 6/1986 |
| JP | 1060360 | 3/1989 |
| JP | 02083327 | 3/1990 |
| JP | 02211854 | 8/1990 |
| JP | 05219921 | 8/1993 |
| JP | 0527666904 | 10/1993 |
| JP | 06038707 | 2/1994 |
| JP | 07067575 | 3/1995 |
| JP | 8501449 | 2/1996 |
| JP | 09155367 | 6/1997 |
| JP | 9508804 | 9/1997 |
| JP | 10501407 | 2/1998 |
| JP | 10502802 | 3/1998 |
| JP | 10150960 | 6/1998 |
| JP | 11089547 | 4/1999 |
| JP | 2000060506 | 2/2000 |
| JP | 2000125827 | 5/2000 |
| JP | 2001190255 | 7/2001 |
| JP | 2001190256 | 7/2001 |
| JP | 2001259659 | 9/2001 |
| JP | 2001514022 | 9/2001 |
| JP | 2001299295 | 10/2001 |
| JP | 2001346556 | 12/2001 |
| JP | 2002017315 | 1/2002 |
| JP | 2002034501 | 2/2002 |
| JP | 2002125639 | 5/2002 |
| JP | 2002523025 | 7/2002 |
| JP | 2001333750 | 12/2004 |
| JP | 037251160 | 7/2009 |
| WO | 9406412 | 3/1994 |
| WO | 9522911 | 8/1995 |
| WO | 9606539 | 3/1996 |
| WO | 9846091 | 10/1998 |
| WO | 9911149 | 3/1999 |
| WO | 0010402 | 3/2000 |
| WO | 2004084655 A1 | 10/2004 |

OTHER PUBLICATIONS

Chung, CH and Day, DF. Glucooligosaccharides from Leuconostoc mesenteroids B-742 (ATCC 13146): a potential prebiotic. 2002. J Industrial Microbiology & Biotechnology. 29: 196-199.*

Mettler S, Rusch C and Colombani PC. Osmolality and pH of sport and other drinks available in Switzerland. 2006. Sportmedizin und Sporttrauamatologie. 54(3): 92-95. [Online]. Dowloaded from URL: <http://www.ssms.ch/ssms_publication/file/240/Osmolality_54_3_06.pdf>.*

Product information for Star-Dri Maltodextrins & Corn Syrup Solids [Online]. Tate & Lyle. 2005. Downloaded from <URL: http://www.tate-lyle.co.uk/NR/rdonlyres/eohrb5gjnjtxor752adyog2koimyz3w4uqgnqgbpskkkdqwowlddxbzqufwjh3ymw5q2ofwnf56l2fvrxxx2wna7c4e/TALFIIASTARDRI2005.pdf> 12 pgs.*

International Search Report in related International Patent Application No. PCT/US2009/063274, dated Feb. 12, 2010.

Gisolfi, Carl V., et al., "Intestinal Fluid Absorption During Exercise: Role of Sport Drink Osmolality and (Na+)", Database Biosis (Online), Biosciences Information Service, Jun. 2001, XP002566352.

Shi, Xiacoai, et al., "Effects of Carbohydrate Type and Concentration and Solution Osmolality on Water Absorption", Database Biosis (Online), Biosciences Information Service, 1995, XP002566353.

Nose, et al., "Role of osmolality and plasma volume during rehydration in humans", American Physiological Society, 1988.

Figaro, et al., "Regulation of fluid intake in dehydrated humans: role of oropharyngeal stimulation", The American Physiological Society, 1997.

Gonzalez-Alonso, et al., Rehydration after Exercise with Common Beverage and Water, Int. J. Sports Med; 13; pp. 399-604; 1992.

Passe, et al., "Impact of beverage acceptability on fluid intake during exercise", Academic Press, 2000.

Clapp, et al., Effects of Carbohydrate-Electrolyte Content of Beverages on Voluntary Hydration in a Simulated Industrial Environment, AIHAJ; 61; Sep./Oct. 2000.

Nielsen, et al., "Fluid balance in exercise dehydration and rehydration with different glucose-electrolyte drinks", Eur J Appl Physiol; 55:318-325; 1986.

Wemple, et al., "Influence of Sodium Replacement on Fluid Ingestion Following Exercise-Induced Dehydration", International Journal Report Nutrition, 7, pp. 104-116, 1997.

The Effectiveness of Commercially Available Sports Drinks, Centre for Human Movement, University of Tasmania, Australia; Sports Medicine, Mar. 29, 2000.

Liang Jiecheng, "Development of Foreign Corn Sugar," Today Science & Technology, No. 9, pp. 9-11, Mar. 5, 1985.

Office Action in related Chinese Patent Application No. 200980146443.9, dated Jul. 24, 2012.

Decision on Grant issued in related Russian Patent Application No. 2011125927, dated Oct. 4, 2012.

* cited by examiner

Fig. 1

Fig. 2

USE OF NOVEL CARBOHYDRATES AND CARBOHYDRATE BLENDS TO PROVIDE A SPORTS BEVERAGE WITH INCREASED ABSORPTION

FIELD OF THE INVENTION

This invention relates to novel carbohydrates, carbohydrate blends and beverages comprising the carbohydrate blends. In particular, this invention relates to rehydration beverages (e.g., sports drinks) having improved absorption of the beverage following consumption by a subject.

BACKGROUND

It has long been known to produce beverages of various formulations. Improved and new formulations are desirable to achieve desired nutritional characteristics, flavor, shelf life, and other objectives. For example, it would be desirable to increase the rate at which a rehydration/sports beverage is absorbed by the body after it has been consumed by a person.

Rehydration beverages may be used in conjunction with physical activity, such as exercise, to replenish fluids and electrolytes lost during the activity as well as to provide additional energy. To this end, rehydration beverages typically comprise at least water, carbohydrates and electrolytes and have a measured osmolality of 250-350 mOsm/kg. The carbohydrates generally included in such beverages are high fructose corn syrup and sucrose.

Osmolality is the number of osmoles of solute per kilogram of solvent, where one osmole is provided by each mole of ion charge. Theoretically, if the osmolality of a beverage is below the osmolality of a subject's plasma, which is typically between about 280 mOsm/kg and about 300 mOsm/kg, the beverage may be absorbed by a subject's gastrointestinal system faster than if the osmolality is above that of the plasma. Consequently, one drawback to the use of a blend of high fructose corn syrup and sucrose in a rehydration/sports beverage is that the initial osmolality of the beverage is about 330 mOsm/kg, which is well above the usual plasma osmolality. In addition, these carbohydrates undergo hydrolysis in solution over time, which increases the osmolality of the beverage and concomitantly decreases the rate of absorption of the beverage.

It is an object of the invention to provide a carbohydrate blend that undergoes minimal hydrolysis in solution over time, thereby substantially maintaining its initial measured osmolality during storage. It is a further object of the invention to provide rehydration/sports beverages, containing such carbohydrate blends, which have a low osmolality and are rapidly absorbed by a subject following consumption. These and other objects, features and advantages of the invention or of certain embodiments of the invention will be apparent to those skilled in the art from the following disclosure and description of exemplary embodiments.

SUMMARY

In accordance with one aspect, a carbohydrate blend is provided, which comprises from 35% by weight to 45% by weight fructose and from 55% by weight to 65% by weight glucose. The carbohydrate blend may include a combination of carbohydrates, such as fructose, glucose, sucrose, leucrose, trehalose, galactose, isomaltulose, dextrose, maltodextrin, corn syrup solids and/or glucooligosaccharides. An aqueous solution containing 6% by weight of the carbohydrate blend has a measured osmolality of 230-300 mOsm/kg. Further, the measured osmolality of the 6% carbohydrate solution does not change by more than 5% during storage for up to six months.

In another aspect, a beverage composition is provided, comprising water and from 4% by weight to 10% by weight of a carbohydrate blend having from 35% by weight to 45% by weight fructose and from 55% by weight to 65% by weight glucose. The beverage may be a rehydration beverage and further include electrolytes, edible acids, vitamins, functional ingredients, coloring agents, flavoring agents and combinations thereof.

In certain embodiments of the carbohydrate blend and beverage composition disclosed here, at least some of the glucose is provided by glucooligosaccharides, which may have a structure containing up to six degrees of saccharide polymerization, while in other embodiments the structure contains up to ten degrees of saccharide polymerization. In certain embodiments, at least some of the glucose is provided by polysaccharides having a degree of polymerization of eleven degrees and greater. In certain exemplary embodiments of beverage compositions according to this disclosure, a rehydration beverage is provided having a measured osmolality in the range of 230 mOsm/kg to 260 mOsm/kg.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF EMBODIMENTS

It should be understood that carbohydrate blends, beverages and other beverage products in accordance with this disclosure may have any of numerous different specific formulations or constitutions. The formulation of a composition in accordance with this disclosure can vary to a certain extent, depending upon such factors as the product's intended market segment, its desired nutritional characteristics, flavor profile and the like. For example, it will generally be an option to add further ingredients to the formulation of a particular embodiment, including any of the formulations described below. Additional (i.e., more and/or other) sweeteners may be added, flavorings, vitamins, colorants, fruit products, tastants, masking agents and the like, and/or flavor enhancers typically can be added to any such formulations to vary the taste, mouthfeel, nutritional characteristics, etc. Based on the guidance provided herein, formulating such other products will be well within the ability of one skilled in the art of formulating food products; such products are also covered by the scope of this invention.

In certain embodiments of the present invention a carbohydrate blend is provided, which may be employed in numerous different comestible products, for example beverage compositions, meal replacement bars, confectioneries, or snack foods. Carbohydrates are typically included in comestible products to provide energy to the muscles, improving endurance performance. The carbohydrate blend may comprise from 35% by weight to 45% by weight fructose and from 55% by weight to 65% by weight glucose. The carbohydrate blend may include fructose, glucose, sucrose, leucrose, trehalose, glactose, isomaltulose, dextrose, maltodextrin, corn syrup solids, glucooligosaccharides and combinations thereof.

In an embodiment, at least some of the glucose is provided by glucooligosaccharides, which may have a structure containing up to six degrees of saccharide polymerization, while in other embodiments the structure contains up to ten degrees of saccharide polymerization. In an embodiment, the glucooligosaccharides are medium-chained oligosaccharides, in which over 90% by weight of the oligosaccharides contain between three and seven degrees of saccharide polymerization. In another embodiment, about 20-30% of the glucose is provided by polysaccharides having a degree of polymerization of eleven degrees and greater.

Oligosaccharides and polysaccharides are typically more resistant to hydrolysis in solution than disaccharides. It has been discovered that unique linkages between the saccharides in glucooligosaccharides may provide stability against hydrolysis of the glucooligosaccharides. In certain embodiments of the present invention, the structure of the glucooligosaccharides included in the carbohydrate blend has an initial α-(1,4) glucose-to-glucose linkage followed by alternating α-(1,3) glucose-to-glucose linkages and α-(1,6) glucose-to-glucose linkages. A suitable glucooligosaccharide is produced by Cargill, Incorporated, Wyzata, Minn., under the name Glucohydrate.

As discussed above, osmolality is defined as the number of osmoles of solute per kilogram of solvent, where one osmole is provided by each mole of ion charge. Glucooligosaccharides have larger molecular weights than smaller carbohydrates, such as disaccharides or monosaccharides. Accordingly, a first solution of a carbohydrate blend comprising a particular weight percent of glucooligosaccharides would have a lower osmolality than a second carbohydrate solution that is identical except that it instead comprises that particular weight percent of disaccharides in place of the glucooligosaccharides. The reason for this is because fewer total moles of carbohydrate would be present in the first solution than in the second solution. Consequently, whereas rehydration beverages comprising sucrose and high fructose corn syrup (HFCS) typically have an initial measured osmolality of about 330 mOsm/kg, an aqueous solution containing between about 4% by weight and about 10% by weight of the carbohydrate blend has a measured osmolality of about 230-300 mOsm/kg. Further, in certain exemplary embodiments of beverage compositions according to this disclosure, a rehydration beverage composition is provided having a measured osmolality in the range of 230 mOsm/kg to 260 mOsm/kg.

Beverage compositions according to different embodiments may comprise one or more carbohydrate source(s). In certain embodiments, the carbohydrates may include sources of monosaccharides, disaccharides and glucooligosaccharides, while in other embodiments the carbohydrates also include sources of polysaccharides, for example corn syrup solids. In certain embodiments, a beverage composition is provided that comprises water and from 4% by weight to 10% by weight of a carbohydrate blend having from 35% by weight to 45% by weight fructose and from 55% by weight to 65% by weight glucose. At least some of the glucose is provided by glucooligosaccharides. The beverage may be a rehydration beverage and further include electrolytes, edible acids, coloring agents, flavoring agents, vitamins, functional ingredients and combinations thereof.

Advantageously, certain embodiments of the present invention provide compositions, such as rehydration beverage compositions, in which the hydrolysis of the carbohydrate source is minimized. Because hydrolysis of carbohydrates results in an increase of the total number of moles of carbohydrate, the osmolality of compositions that are subjected to hydrolysis will exhibit an increase in measured osmolality over time. In contrast, the measured osmolality of compositions comprising 4% by weight to 10% by weight of a carbohydrate blend according to the present invention does not increase by more than 5% during storage for up to six months. Accordingly, compositions according to embodiments of the invention generally provide rehydration beverages that have a measured osmolality below that of plasma, (e.g., approximately 300 mOsm/kg), and are quickly absorbed by the gastrointestinal system both immediately, and for up to at least six months, following manufacture.

In embodiments providing a packaged ready-to-drink beverage, the beverage composition may be pre-mixed with a liquid such as water. In certain embodiments, the ready-to-drink beverage comprises about 80-99 weight percent (wt %) of liquid of the total weight of the beverage. Unless otherwise specified, all weight percentages are based on the total weight of a ready-to-drink beverage. In further embodiments, the beverage composition can be packaged as an edible composition or concentrate, such as a dry mix (e.g., powder) or a liquid concentrate for later reconstitution with one or more liquids to form a beverage. The concentrated composition may be associated with instructions for preparing the beverage composition. In another embodiment, a beverage concentrate may be packaged as gels, capsules, or tablets which are consumed with liquid. When provided in these forms, the beverage composition may comprise instructions to mix or consume with an amount of liquid which is equal to about 80-99 wt % of the prepared beverage composition.

In general, a rehydration/sports beverage in accordance with this disclosure typically comprises at least water, one or more carbohydrates, electrolytes, acidulant and flavoring. Exemplary flavorings which may be suitable for at least certain formulations in accordance with this disclosure include citrus flavoring, spice flavorings and others. Preservatives can be added if desired, depending upon the other ingredients, production technique, desired shelf life, etc. Additional and alternative suitable ingredients will be recognized by those skilled in the art given the benefit of this disclosure.

At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

In one embodiment, the beverage composition includes an electrolyte source for providing sodium (Na). Sodium may be provided by compounds of sodium, such as sodium chloride, sodium citrate, sodium carbonate, sodium bicarbonate, or combinations thereof. In select embodiments, the amount of sodium is about 0.03% by weight to about 0.06% by weight of the beverage. Other amounts may also be useful, depending on the application and other factors. In one embodiment, the sodium is provided by sodium chloride and sodium citrate. As shown in both exemplary formulations in Table 1, the sodium citrate is about 0.0659% by weight of the beverage composition and sodium chloride is about 0.0659% by weight of the beverage composition.

Additional types of electrolyte sources to provide, for example, potassium (K), magnesium (Mg), calcium (Ca) and chloride (Cl) ions can also be included in the beverage composition in addition to or independently of sodium (Na). The different types of electrolytes can be provided by their compounds or a combination of their compounds. For example, the compounds can include potassium acetate, potassium bicarbonate, potassium bromide, potassium chloride, potassium citrate, potassium-D-gluconate, mono- and dibasic potassium phosphate, calcium acetate, calcium chloride, calcium citrate, calcium-D-gluconate, calcium lactate, calcium laevulinate, dibasic calcium phosphate, magnesium chloride, magnesium carbonate and magnesium sulphate, or a combination thereof. In one embodiment, the potassium ions are provided by monopotassium phosphate or dipotassium phosphate. In one such embodiment, monopotassium phosphate comprises around about 0.0439% by weight of the beverage composition. In another embodiment, the beverage may contain about 0.01% by weight to about 0.04% by weight of potassium, about 0.01% by weight to about 0.02% by weight of magnesium, about 0.001% by weight to about 0.003% by weight of calcium, about 0.02% by weight to about 0.03% by weight of chloride. Other amounts or combinations may also be useful.

Non-mineral nutritive compounds such as vitamins can be added to the beverage composition. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Acid used in beverages disclosed here can serve any one or more of several functions, including, for example, providing antioxidant activity, lending tartness to the taste of the beverage, enhancing palatability, increasing thirst quenching effect, modifying sweetness and acting as a mild preservative by providing microbiological stability. Any suitable edible acid may be used, for example citric acid, malic acid, tartaric acid, phosphoric acid, ascorbic acid, lactic acid, formic acid, fumaric acid, gluconic acid, succinic acid, maleic acid, sodium acid sulphate and/or adipic acid. The acid can be used in solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, benzoic acid or its salts (benzoates) may be employed as preservatives in the beverage products.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products.

For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of various of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids and cloud components.

EXAMPLES

Example 1

A beverage composition was prepared using a carbohydrate blend according to the present invention. The particular ingredients and the weight percent of each ingredient included in the rehydration beverage composition are listed below in Table 1. The carbohydrate blend comprised 35.1% by weight fructose, 4.7% by weight leucrose and glucose, and 60.1% by weight of glucooligosaccharides having a degree of polymerization between two and nine. The initial osmolality of the prepared rehydration beverage composition was measured to be 247 mOsm/kg.

TABLE 1

Formulation for a rehydration beverage composition containing a carbohydrate blend according to Example 1.

| Ingredient | Weight % in the Beverage Composition |
| --- | --- |
| Water | 91.869 |
| Glucohydrate | 7.5853 |
| Sodium Chloride | 0.0659 |
| Sodium Citrate | 0.0659 |
| Monopotassium Phosphate | 0.0439 |
| Citric Acid | 0.2700 |
| Color and Flavor Blend | 0.1000 |

Example 2

The rehydration beverage composition prepared according to Example 1 was tested to determine stability of the composition to hydrolysis over time. Rehydration beverage compositions were prepared as formulated and hot filled into 20 oz. polyethylene terephthalate (PET) bottles. Once the compositions had cooled to approximately 70° F., they were tested for initial osmolality. Experimentation for stability against hydrolysis was performed by placing half of the bottles in an incubator set at 110° F. and the other half of the bottles in an incubator set at 70° F., then measuring the osmolality of the samples over time.

In addition to the rehydration beverage compositions comprising the carbohydrate blend, control samples were tested, to measure the stability of the carbohydrate to hydrolysis in a rehydration beverage containing a typical carbohydrate source. The control samples were prepared according to the formulation in Example 1, except for the carbohydrate component, which contained only high fructose corn syrup and sucrose. Half of the control sample bottles were placed in the incubator set at 110° F. and the other half were placed in the incubator set at 70° F., then the osmolality of the control samples was measured over time.

Figure 1:
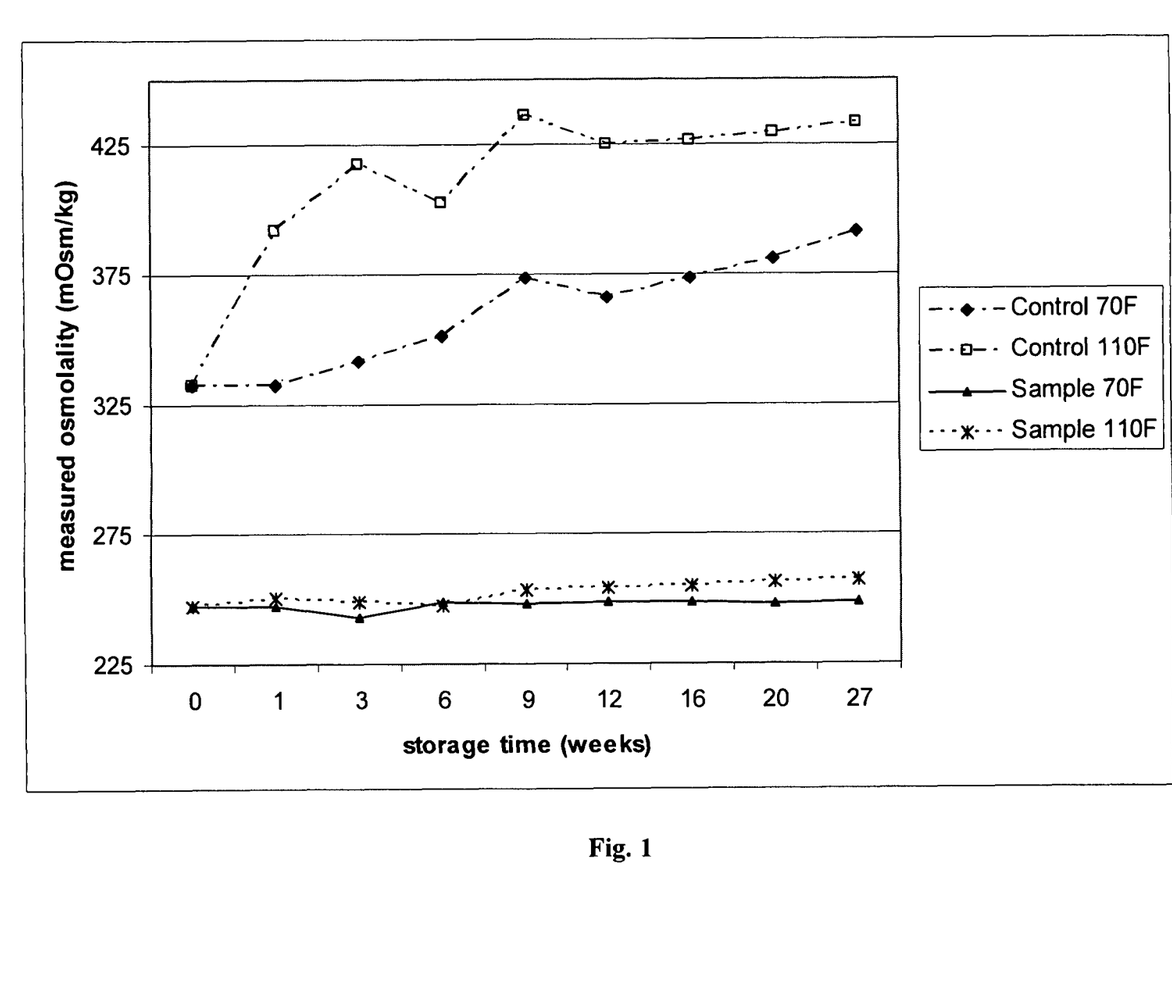
FIG. 1 provides a graph of measured osmolality in exemplary beverage compositions during storage over time.

During storage, at certain time intervals one bottle each of the samples and control samples was removed from each of the two incubators and analyzed for osmolality. The osmolality was measured on an osmometer (Advanced Instruments Osmometer Model 3D3, Advanced Instruments Inc., Norwood, Mass.) to determine the osmolality value of each solution, in units of milliosmoles per kilogram (mOsm/kg). As discussed above, when carbohydrates present in solution are broken down via hydrolysis, the osmolality of the solution increases because the hydrolysis results in the production of more moles of carbohydrate ions. The measured osmolality values of the experimental samples over 27 weeks of storage are shown in FIG. 1. Standard conditions experienced by rehydration beverage products may include up to six months, or approximately twenty-seven weeks, of storage at a temperature of up to 70° F., following manufacture of the product. In instances when the product is stored in a location that is not temperature controlled, the ambient temperature around the rehydration beverage product may be as high as 110° F.

The results provided in FIG. 1 show that the control samples experienced hydrolysis sufficient to increase the osmolality of the solution from an initial measured value of 332 mOsm/kg to a value of 391 mOsm/kg after 27 weeks of storage at 70° F., which was an increase of approximately 18%. Storing the control samples at an elevated temperature resulted in a greater change in osmolality of the control samples during storage, rising to a measured value of 433 mOsm/kg after 27 weeks of storage at 110° F., which was an increase of approximately 30%.

In contrast to the control samples containing HFCS and sucrose as the carbohydrate sources, the rehydration beverage composition samples comprising a carbohydrate blend according to the present invention exhibited very little hydrolysis during storage. In particular, the results displayed in FIG. 1 show that the rehydration beverage composition samples had an initial measured osmolality of 247 mOsm/kg and rose only to a value of 249 mOsm/kg following 27 weeks of storage at 70° F., which was an increase of approximately 1%. Storage at an elevated temperature resulted in a slightly greater increase in osmolality during storage by rising to a measured value of osmolality of 257 mOsm/kg, which was an increase of approximately 4%. Consequently, rehydration beverages comprising carbohydrate blends of the present invention are expected to substantially maintain their initial ability to be more quickly absorbed by the gastrointestinal system of a subject than beverages having higher osmolalities, even during storage at up to 110° F. for at least about six months.

Example 3

A beverage composition was prepared using a carbohydrate blend according to the present invention. The particular ingredients and the weight percent of each ingredient included in the rehydration beverage composition are listed below in Table 2. The carbohydrate blend contained crystalline fructose and Star-Dri® 240 Corn Syrup Solids. Star-Dri® products are commercially available from the A.E. Staley Manufacturing Company, Decatur, Ill. The carbohydrate blend comprised 35.0% by weight fructose, 3.6% by weight glucose, 41.8% by weight of glucooligosaccharides having a degree of polymerization between two and ten, and 19.6% by weight of polysaccharides having a degree of polymerization of eleven and greater. The initial osmolality of the prepared rehydration beverage composition was measured to be 243 mOsm/kg.

TABLE 2

Formulation for a rehydration beverage composition containing a carbohydrate blend according to Example 3.

| Ingredient | Weight % in the Beverage Composition |
|---|---|
| Water | 93.1385 |
| Crystalline Fructose | 2.2105 |
| Star-Dri ® 240 Corn Syrup Solids | 4.1053 |
| Sodium Chloride | 0.0659 |
| Sodium Citrate | 0.0659 |
| Monopotassium Phosphate | 0.0439 |
| Citric Acid | 0.2700 |
| Color and Flavor Blend | 0.1000 |

Example 4

A beverage composition was prepared using a carbohydrate blend according to the present invention. The particular ingredients and the weight percent of each ingredient included in the rehydration beverage composition are listed below in Table 3. The carbohydrate blend contained crystalline fructose and Star-Dri® 200 Corn Syrup Solids. The carbohydrate blend comprised 35.0% by weight fructose, 1.4% by weight glucose, 39.5% by weight of glucooligosaccharides having a degree of polymerization between two and ten, and 24.1% by weight of polysaccharides having a degree of polymerization of eleven and greater. The initial osmolality of the prepared rehydration beverage composition was measured to be 243 mOsm/kg.

TABLE 3

Formulation for a rehydration beverage composition containing a carbohydrate blend according to Example 4.

| Ingredient | Weight % in the Beverage Composition |
|---|---|
| Water | 93.1385 |
| Crystalline Fructose | 2.2105 |
| Star-Dri ® 200 Corn Syrup Solids | 4.1053 |
| Sodium Chloride | 0.0659 |
| Sodium Citrate | 0.0659 |
| Monopotassium Phosphate | 0.0439 |
| Citric Acid | 0.2700 |
| Color and Flavor Blend | 0.1000 |

Example 5

A beverage composition was prepared using a carbohydrate blend according to the present invention. The particular ingredients and the weight percent of each ingredient included in the rehydration beverage composition are listed below in Table 2. The carbohydrate blend contained crystalline fructose and Star-Dri® 180 Corn Syrup Solids. The carbohydrate blend comprised 35.0% by weight fructose, 1.0% by weight glucose, 35.0% by weight of glucooligosaccharides having a degree of polymerization between two and ten, and 29.0% by weight of polysaccharides having a degree of polymerization of eleven and greater. The initial osmolality of the prepared rehydration beverage composition was measured to be 232 mOsm/kg.

TABLE 4

Formulation for a rehydration beverage composition containing a carbohydrate blend according to Example 5.

| Ingredient | Weight % in the Beverage Composition |
|---|---|
| Water | 93.1385 |
| Crystalline Fructose | 2.2105 |
| Star-Dri ® 180 Corn Syrup Solids | 4.1053 |
| Sodium Chloride | 0.0659 |
| Sodium Citrate | 0.0659 |
| Monopotassium Phosphate | 0.0439 |
| Citric Acid | 0.2700 |
| Color and Flavor Blend | 0.1000 |

Example 6

The rehydration beverage compositions prepared according to Examples 3, 4 and 5 were tested to determine stability of the composition to hydrolysis over time. Rehydration beverage compositions were prepared as formulated and hot filled into 20 oz. polyethylene terephthalate (PET) bottles. Once the compositions had cooled to approximately 70° F., they were tested for initial osmolality. Experimentation for stability against hydrolysis was performed on the bottles in an incubator set at 70° F., by measuring the osmolality of the samples over time.

Figure 2:
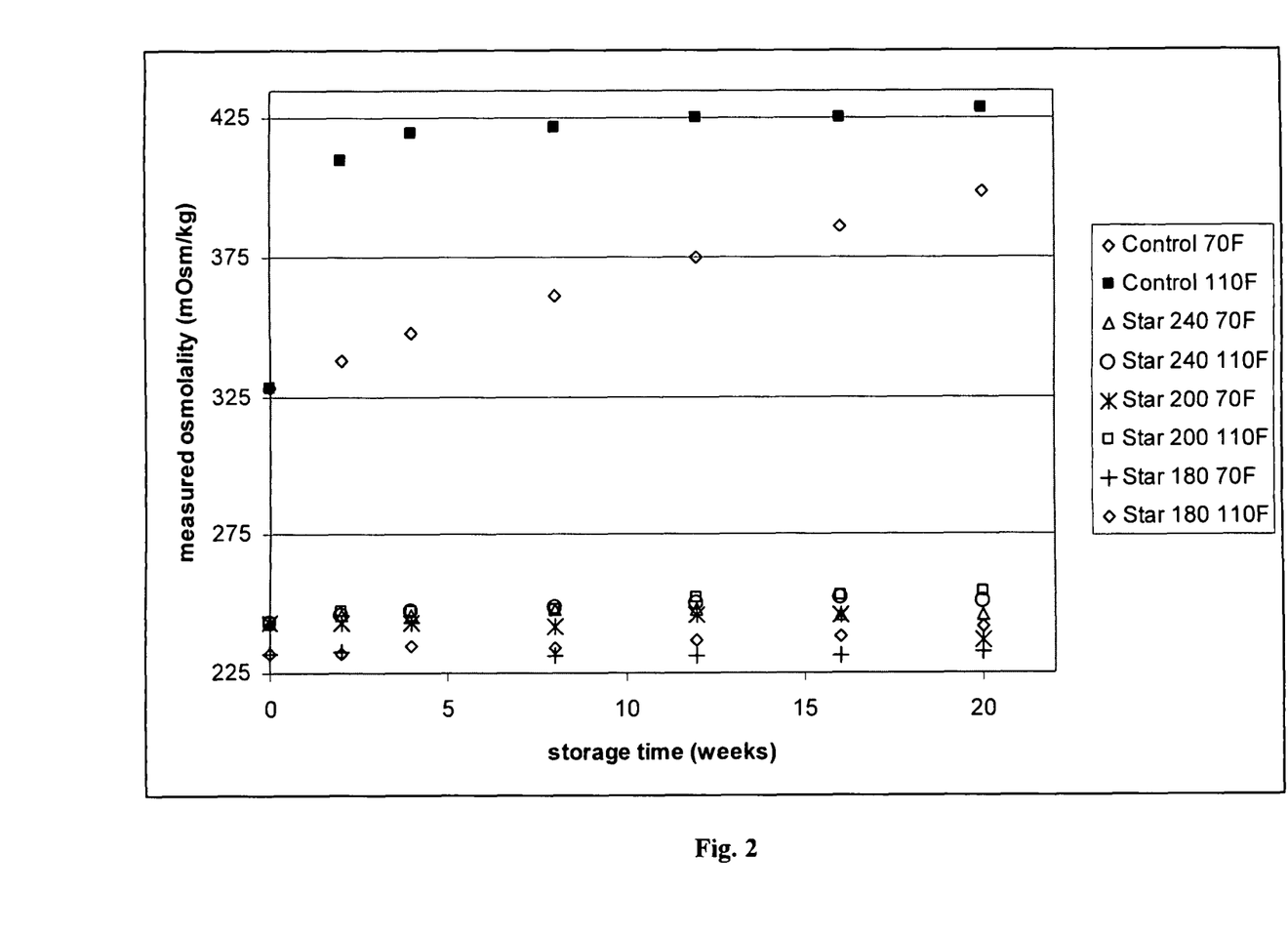
FIG. 2 provides a graph of measured osmolality in further exemplary beverage compositions during storage over time.

During storage, at certain time intervals one bottle each of the samples was removed from the incubator and analyzed for osmolality. The osmolality was measured on an Advanced Instruments Osmometer (Model 3D3) to determine the osmolality value of each solution, in mOsm/kg. The measured osmolality values of the experimental samples over 20 weeks of storage are shown in FIG. 2.

The results show that the rehydration beverage composition samples comprising a carbohydrate blend of fructose and corn syrup solids exhibited very little hydrolysis during storage. In particular, the results show that the rehydration beverage compositions of Example 3 and Example 4 each had an initial measured osmolality of 243 mOsm/kg and each rose only to a value of 246 mOsm/kg following 20 weeks of storage at 70° F., which was an increase of approximately 1%. Similarly, the rehydration beverage composition of Example 5 had an initial measured osmolality of 232 mOsm/kg and rose only to a value of 238 mOsm/kg following 20 weeks of storage at 70° F., which was an increase of approximately 2.5%. Consequently, rehydration beverages comprising carbohydrate blends of the present invention are expected to substantially maintain their initial ability to be more quickly absorbed by the gastrointestinal system of a subject than beverages having higher osmolalities.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A carbohydrate blend comprising from 55% by weight to 65% by weight glucose provided at least in part by glucooligosaccharides and from 35% by weight to 45% by weight fructose, wherein at least 90% by weight of the glucooligosaccharides comprise a structure having between three and seven degrees of saccharide polymerization, or wherein about 20-30% by weight of the glucose is provided by polysaccharides having a degree of polymerization of eleven degrees or greater; and an electrolyte source comprising sodium and potassium; wherein the carbohydrate blend is resistant to hydrolysis such that, when mixed with water to produce a solution comprising water and 6% by weight of the carbohydrate blend, the blend provides a solution with an initial measured osmolality in the range of 230-260 mOsm/kg immediately after production and the solution has a stored measured osmolality after storage of the solution for twenty weeks after production that does not increase by more than 5% when compared to the initial measured osmolality.

2. The carbohydrate blend of claim 1, wherein the carbohydrate blend comprises carbohydrates selected from the group consisting of sucrose, leucrose, trehalose, glactose, isomaltulose, dextrose, maltodextrin, corn syrup solids and combinations thereof.

3. The carbohydrate blend of claim 1, wherein the structure of the glucooligosaccharides has an initial α-(1,4) glucose-to-glucose linkage followed by alternating α-(1,3) glucose-to-glucose linkages and α-(1,6) glucose-to-glucose linkages.

4. The carbohydrate blend of claim 1, wherein the glucose is provided at least in part by glucooligosaccharides and polysaccharides, and wherein at least 90% by weight of the glucooligosaccharides comprise a structure having between three and seven degrees of saccharide polymerization and about 20-30% by weight of the glucose is provided by polysaccharides having a degree of polymerization of eleven degrees or greater.

5. A beverage composition comprising water; an electrolyte source comprising sodium and potassium; and from 4% by weight to 10% by weight of a carbohydrate blend, the carbohydrate blend comprising from 55% by weight to 65% by weight glucose provided at least in part by glucooligosaccharides and from 35% by weight to 45% by weight fructose, wherein at least 90% by weight of the glucooligosaccharides comprise a structure having between three and seven degrees of saccharide polymerization, or wherein about 20-30% by weight of the glucose is provided by polysaccharides having a degree of polymerization of eleven degrees or greater; wherein the beverage composition has an initial measured osmolality in the range of 230-260 mOsm/kg immediately after preparation of the composition and the beverage composition has a stored measured osmolality after storage for twenty weeks after production that does not increase by more than 5% when compared to the initial measured osmolality.

6. The beverage composition of claim 5, further comprising at least one component selected from the group consisting of edible acids, coloring agents and flavoring agents.

7. The beverage composition of claim 6, wherein the carbohydrate blend comprises carbohydrates selected from the group consisting of sucrose, leucrose, trehalose, glactose, isomaltulose, dextrose, maltodextrin, corn syrup solids and combinations thereof.

8. The beverage composition of claim 5, wherein the structure of the glucooligosaccharides has an initial α-(1,4) glucose-to-glucose linkage followed by alternating α-(1,3) glucose-to-glucose linkages and α-(1,6) glucose-to-glucose linkages.

9. The beverage composition of claim 5, comprising 6% by weight of the carbohydrate blend.

10. The beverage composition of claim 5, wherein the electrolyte source further comprises at least one electrolyte selected from the group consisting of magnesium, calcium, chloride.

11. The beverage composition of claim 10, comprising about 0.01% by weight to about 0.04% by weight of potassium; about 0.01% by weight to about 0.02% by weight of magnesium; about 0.001% by weight to about 0.003% by weight of calcium; and about 0.02% by weight to about 0.03% by weight of chloride.

12. The beverage composition of claim 5 wherein the glucose is provided at least in part by glucooligosaccharides and polysaccharides, and wherein at least 90% by weight of the glucooligosaccharides comprise a structure having between three and seven degrees of saccharide polymerization and about 20-30% by weight of the glucose is provided by polysaccharides having a degree of polymerization of eleven degrees or greater.

13. A beverage composition comprising water; an electrolyte source comprising sodium and potassium; and from 4% by weight to 10% by weight of a carbohydrate blend, the carbohydrate blend comprising from 55% by weight to 65% by weight glucose provided at least in part by corn syrup solids comprising glucooligosaccharides and polysaccharides, and wherein about 20-30% by weight of the glucose is provided by polysaccharides having a degree of polymerization of eleven degrees or greater, and from 35% by weight to 45% by weight fructose; wherein the beverage composition has an initial measured osmolality in the range of 230-260 mOsm/kg immediately after preparation of the composition and the beverage composition has a stored measured osmolality after storage for twenty weeks after production that does not increase by more than 5% when compared to the initial measured osmolality.

14. The beverage composition of claim 13, further comprising at least one component selected from the group consisting of edible acids, coloring agents and flavoring agents.

15. The beverage composition of claim 13, wherein the electrolyte source further comprises at least one electrolyte selected from the group consisting of magnesium, calcium, chloride.

16. The beverage composition of claim 13, wherein at least 90% by weight of the glucooligosaccharides comprise a structure having between three and seven degrees of saccharide polymerization.

* * * * *